US008306327B2

(12) United States Patent
Ben-Horesh et al.

(10) Patent No.: US 8,306,327 B2
(45) Date of Patent: Nov. 6, 2012

(54) ADAPTIVE PARTIAL CHARACTER RECOGNITION

(75) Inventors: Ami Ben-Horesh, Holon (IL); Amir Geva, Yokneam (IL); Eugeniusz Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 12/346,221

(22) Filed: Dec. 30, 2008

(65) Prior Publication Data

US 2010/0166318 A1    Jul. 1, 2010

(51) Int. Cl.
G06K 9/34 (2006.01)
G06K 9/18 (2006.01)
G06K 9/00 (2006.01)
G06K 9/46 (2006.01)
G06K 9/66 (2006.01)
G06K 7/10 (2006.01)

(52) U.S. Cl. ........ 382/187; 382/190; 382/321; 382/178; 382/182; 382/195

(58) Field of Classification Search .................. 382/321, 382/195, 190
See application file for complete search history.

(56) References Cited

U.S. PATENT DOCUMENTS

| | | | | | |
|---|---|---|---|---|---|
| 5,202,933 | A | * | 4/1993 | Bloomberg | 382/176 |
| 5,570,435 | A | * | 10/1996 | Bloomberg et al. | 382/283 |
| 5,706,364 | A | * | 1/1998 | Kopec et al. | 382/159 |
| 5,802,204 | A | * | 9/1998 | Basehore | 382/186 |
| 6,694,056 | B1 | * | 2/2004 | Ito et al. | 382/186 |
| 6,999,635 | B1 | * | 2/2006 | Kozlowski | 382/289 |
| 7,043,079 | B2 | * | 5/2006 | Malvar et al. | 382/195 |
| 7,376,266 | B2 | * | 5/2008 | Simard et al. | 382/166 |
| 7,397,952 | B2 | * | 7/2008 | Malvar et al. | 382/195 |
| 2002/0131642 | A1 | | 9/2002 | Lee et al. | |
| 2003/0190077 | A1 | | 10/2003 | Ross et al. | |
| 2004/0141645 | A1 | | 7/2004 | Lee et al. | |
| 2004/0141646 | A1 | * | 7/2004 | Mahmoud Fahmy et al. | 382/187 |
| 2007/0078300 | A1 | * | 4/2007 | Zinaty et al. | 600/102 |

FOREIGN PATENT DOCUMENTS

| | | |
|---|---|---|
| EP | 0542566 | 5/1993 |
| JP | 05210761 | 8/1993 |
| JP | 07014005 | 1/1995 |

OTHER PUBLICATIONS

Fukushima, "Neutral Network Model Restoring Partly Occluded Patterns", International Journal of Knowledge-Based and Intelligent Techniques in Engineering Applications, Apr. 2004, vol. 8, Issue 2, pp. 59-67.

Qu et al., "A Stroke Based Algorithm for Dynamic Signature Verification", CCECE 2004, 2004, IEEE.

* cited by examiner

*Primary Examiner* — Michelle Entezari
(74) *Attorney, Agent, or Firm* — Scully, Scott, Murphy & Presser, P.C.

(57) ABSTRACT

A method and system for recognizing a character affected by a noise or an obstruction is disclosed. After receiving an image with characters, a character being affected by a noise or an obstruction is determined. Then, areas in the character where the noise or obstruction affected are precisely located. Templates representing every possible character in the image are updated by removing equivalent areas to the areas in the character being affected by the noise or obstruction. Then, the character is classified in a template among the updated templates by finding the template having the highest number of matching pixels with the character.

18 Claims, 6 Drawing Sheets

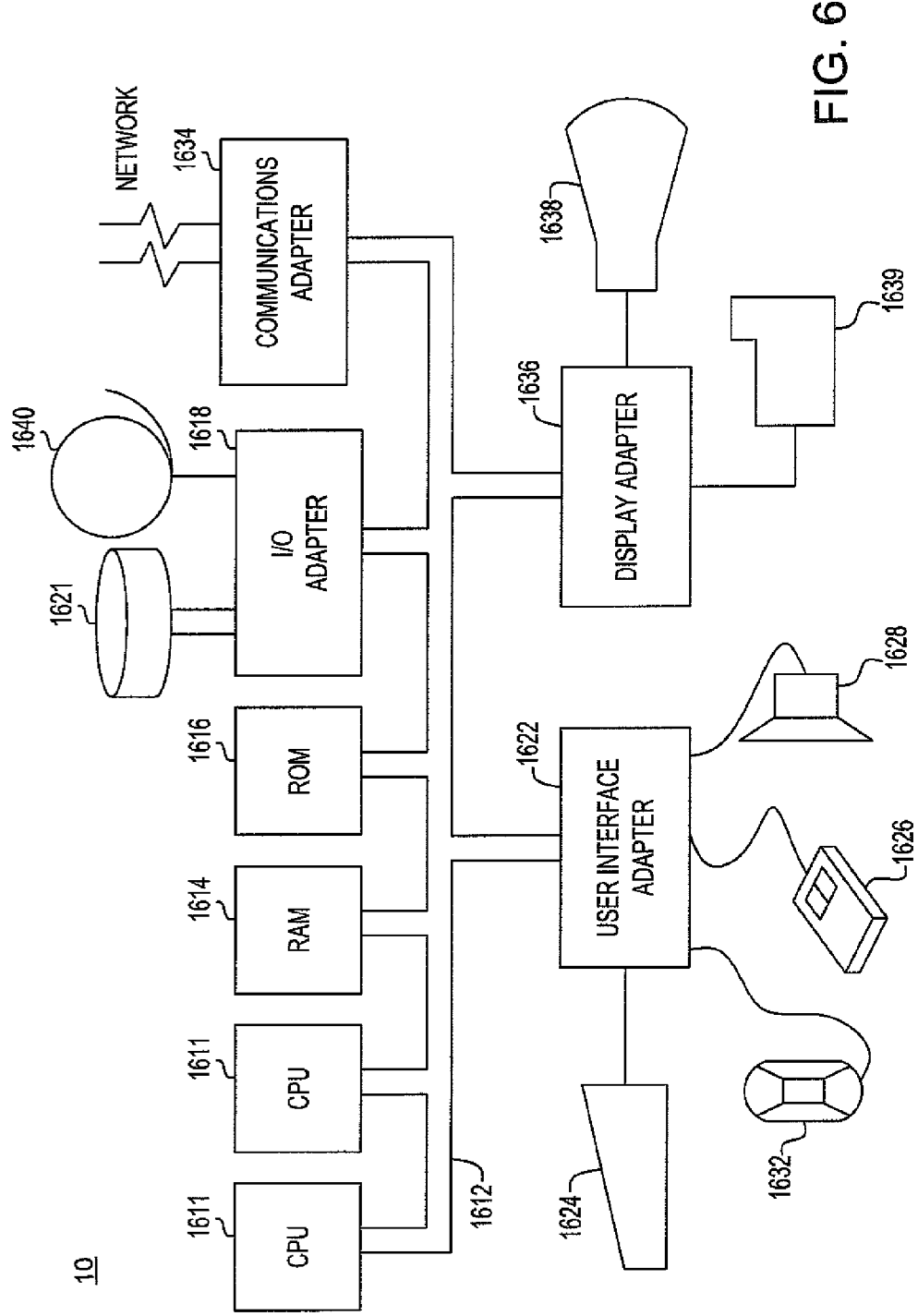

ADAPTIVE PARTIAL CHARACTER RECOGNITION

BACKGROUND OF THE INVENTION

1. Fields of the Invention

The present invention generally relates to OCR (Optical Character Recognition). More particularly, the present invention relates to recognizing a character under a noisy condition.

2. Description of the Prior Art

Optical Character Recognition (OCR) refers to a mechanical or electronic translation of images of handwritten, typewritten or printed text (usually captured by a scanner) into a machine-editable text. Microsoft Office® Document Imaging (MODI) and Tesseract from Google® are examples of the OCR.

Systems performing the OCR are common and perform character recognition on a wide variety images according to diverse application, e.g., a pattern recognition, artificial intelligence and machine vision. However, a traditional OCR method fails to recognize a photographed character, for example, if the photo of the character is partially obscured or distorted because of dirt or an obstruction on the character photograph.

In order to recognize a character under a noisy or obstructed condition, techniques have developed to train the systems (systems performing the OCR) to recognize parts of characters, e.g., lower half of a character, and uses an elimination (e.g., throwing away upper half of the character) to identify the character. For example, a US Pre-Granted Publication (US 2002/0131642 A1) (hereinafter "'642") describes that "a method in '642 improves classification accuracy by improving the effectiveness or robustness of the underlying normalized correlation operation; the method partitions each unknown input character into several pre-defined overlapping regions; each region is evaluated independently against a library of template regions; a normalized correlation operation is then performed between the unknown input character region and each of the character template regions defined in the character library".

The techniques, e.g., the method described in '642, often work well. However, the techniques may produce non-optimal results, because selecting a predefined part of a character may leave some of unobstructed information unused. For example, assume that a system performing the OCR is trained to recognize lower half of a character. Then, when the system receives a character like FIG. 3 (a), the system may not be able to identify whether the character is 3 or 5 by considering only lower half of the character.

Therefore, it would be desirable to have a system and method for recognizing a character with a noise or an obstruction by utilizing all unobstructed information in the character.

SUMMARY OF THE INVENTION

The present invention describes a method and a system for recognizing a character with a noise or an obstruction by adaptively estimating noisy information in the character based on all available unobstructed information in the character.

In one embodiment, there is provided a system for recognizing a character with a noise or an obstruction in an image, the image including a plurality of characters, comprising:

means for detecting the noise or the obstruction in the character;

means for providing one or more templates of the plurality of characters;

means for updating the one or more templates of the plurality of characters based on the detected noise or the detected obstruction; and means for classifying the character in one of the updated templates of the plurality of characters, the character being recognized as a letter, number or symbol that the template, which the character is classified in, represents.

In one embodiment, there is provided a method for recognizing a character with a noise or an obstruction in an image, the image including a plurality of characters, comprising:

detecting the noise or the obstruction in the character;

providing one or more templates of the plurality of characters;

updating the one or more templates of the plurality of characters based on the detected noise or the detected obstruction; and classifying the character in one of the updated templates of the plurality of characters, the character being recognized as a letter, number or symbol that the template, which the character is classified in, represents.

In a further embodiment, the present invention discusses the updating includes removing the at least one area in the templates and removing the at least one area in the character.

In a further embodiment, the present invention discusses the classifying comprises:

counting the number of matching first-type pixels that are first-type both in a template and the character;

counting the number of matching second-type pixels that are second-type both in the template and the character;

setting pixels in the at least one area in the character as don't care pixels;

counting the number of don't care pixels in the character;

calculating a value of (the number of matching first-type pixels+the number of matching second-type pixels−the number of don't care pixels) for each pair of each template and the character;

selecting a pair of a template and the character that has a highest calculated value among the calculated values of pairs of each template and the character; and identifying the character as the letter, the number or the symbol that the template in the selected pair represents.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

FIG. 6 illustrate a hardware configuration of a system executing the method steps in FIG. 1 according to one embodiment of the present invention.

DETAILED DESCRIPTION

Figure 1:
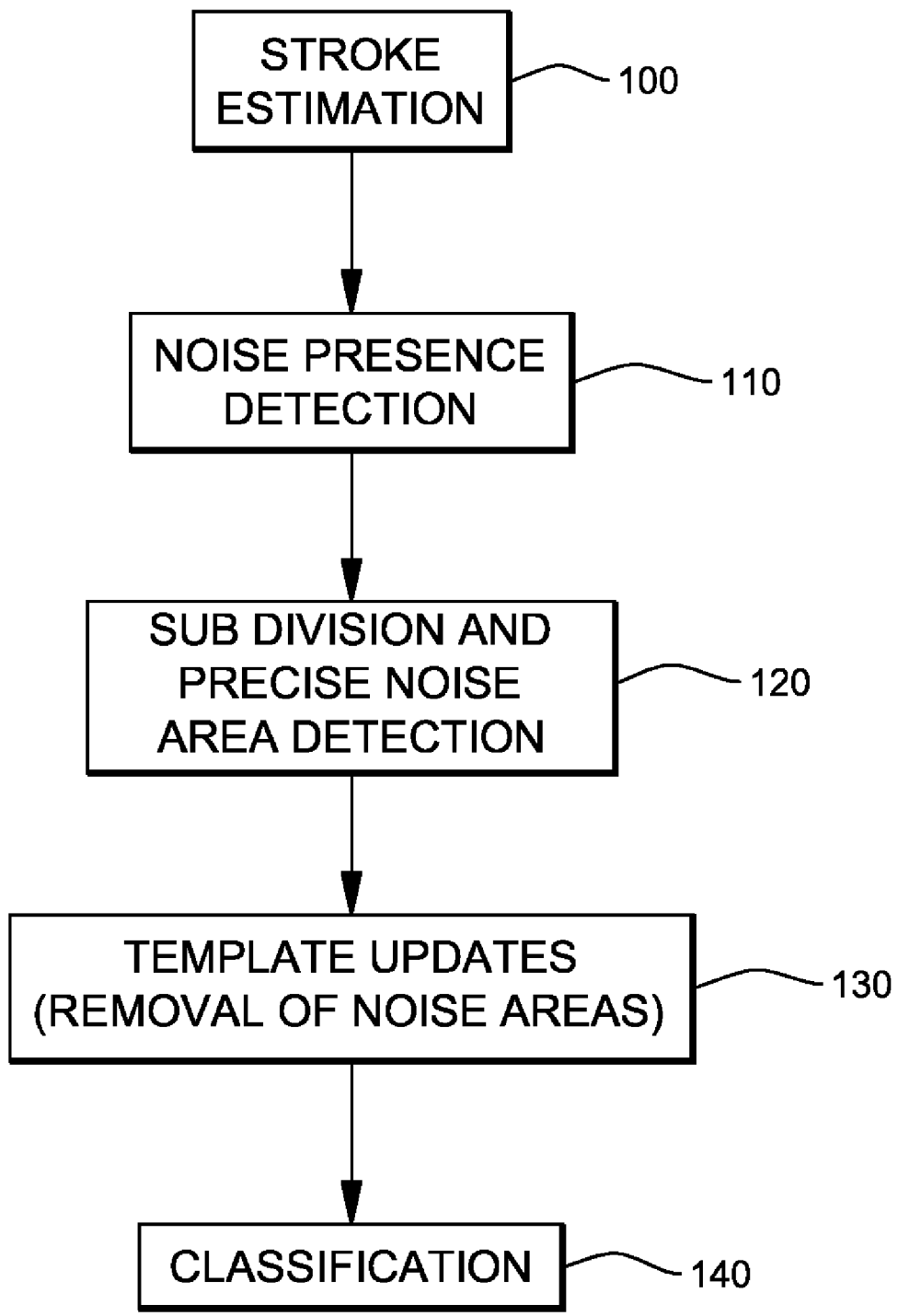
FIG. 1 illustrates method steps that one embodiment of the present invention employs.

FIG. 1 illustrates method steps that one embodiment of the present invention employs. A system performing an OCR (e.g., a system 10 in FIG. 2) receives an image including characters. In one embodiment, the system performs stroke feature estimation (e.g., a step 100 in FIG. 1), noise detection in a character (e.g., a step 110 in FIG. 1), diving the character to precisely locate the noise (e.g., a step 120 in FIG. 1), updating templates (e.g., a step 130 in FIG. 1) and matching a template to the character (e.g., a step 140 in FIG. 1). Steps in FIG. 1 are described in detail later. Some of the characters in the image may be distorted due to a noise or an obstruction. A noise or obstruction can come from anything that modifies the image. For example, in documents, the noise or obstruction can be a stain or stamp being placed on the documents before scanning. In natural images, a noise or obstruction can be dirt that covers part of an object being photographed. The image including characters is, but is not limited to, a JPEG file, a Bitmap file, a gif file, a TIFF file, a raw image file and a PNG file. The characters may be hand-written characters, typed characters and/or printed characters.

Upon receiving the image, the system starts to recognize each character in the image by matching the character to templates. Templates are provided from a template storage device (e.g., a template database 220). The template storage device stores templates which represent all possible characters in the image. Templates represent all possible characters. In one embodiment, a template represents a character, e.g., a letter, a number or a symbol. While matching a character to templates, the system looks for a template which is similar to the character. In one embodiment, the system measures a similarity between the character and a template. The similarity may be measured by counting matching pixels between the character and the template. If the character and a template have matching pixels higher than a threshold, the template may be selected to represent the character. For example, if more than 70% of total pixels in the character and in a template are matched each other (i.e., have equal attributes, characteristics or properties), then the template may be selected to represent the character. If more than one template is selected to represent the character, a template having higher similarity (e.g., having more matching pixels) is chosen to represent the character. In the present invention, an attribute, characteristic or property refers to the number of bits per pixel, color depth, a pixel position, etc.

Figure 4:
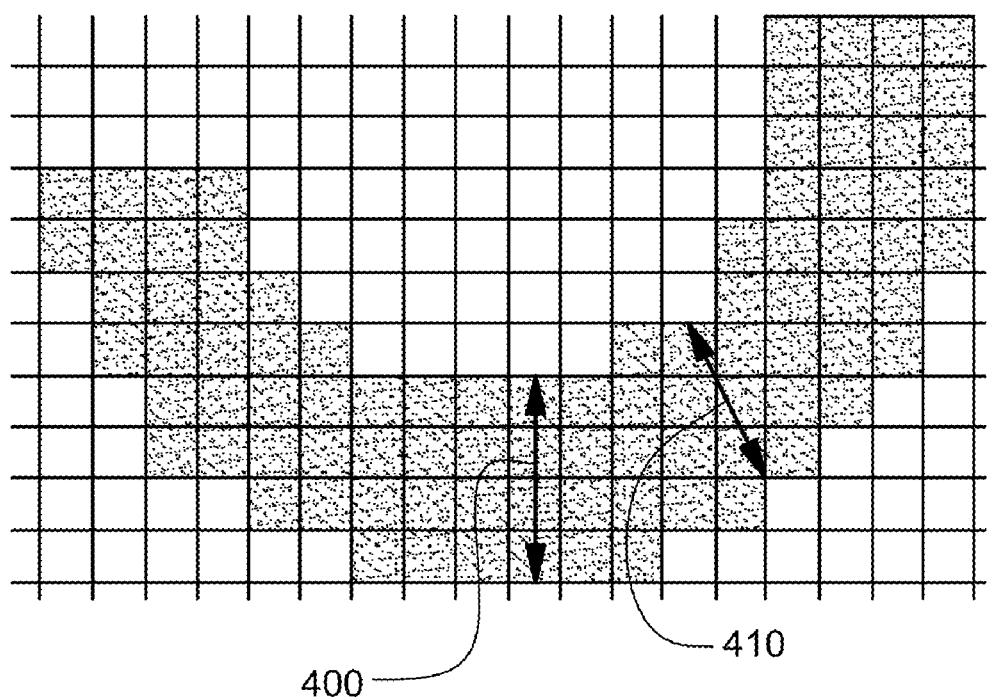
FIG. 4 illustrates an example of a stroke feature.

However, for a character with a noise or an obstruction, the system may not be able to find a template for the character. For example, if similarity between the character and every template is less than a threshold, no template is chosen to represent the character. Then, at step 100, the system measures a stroke feature of the character. A stroke refers to a line that may be drawn by a movement of a pen, pencil, stylus, digital writing tablet, digital touch screen interface, etc. In a typed character and a printed character, the stroke may be created by a computer user. A stroke feature is an attribute of the stroke. The attribute of the stroke includes, but is not limited to, a stroke width, a stroke length, a stroke size, a stroke duration, a stroke orientation, a stoke shape and a stroke pattern. FIG. 4 illustrates an example of measuring a stroke width. Arrows 400 and 410 shows width of a stroke. In this example shown in FIG. 4, the stroke width is 4 pixels width. The stroke length is measured by counting the number of pixels on the stroke horizontally from an end to an end. The stroke size is measured by counting all the pixels in the stroke. The stroke duration is measured from a point the stroke being made to a point that the stroke being completed. The stroke orientation is measured by a position of the stroke, e.g., where the stroke is placed in an image. The stroke shape is measured by a sharpness of an edge in the stroke, an angle of the stroke and/or a roundness of the stroke. The stroke pattern is measured by a speed, size, limb, orientation, slant, direction, signal-to-noise ratio and/or movement of the stroke.

In one embodiment, while measuring the stroke feature of the character, the system may also measure a stroke feature of adjacent characters of the character. The adjacent characters of the character refer characters on left, right, bottom or top of the character. The adjacent characters may not have any distortion affected by a noise or an obstruction. Thus, the adjacent characters might already find a corresponding template. The system may further measure statistics of the adjacent characters. The statistics includes, but is not limited to, a font height, an ascent value and a descent value. The font height refers to an average number of vertical pixels on the adjacent characters. The ascent value refers to an average number of pixels from a baseline of the adjacent characters to top of the adjacent characters. The descent value refers to an average number of pixels from a baseline of the adjacent characters to a bottom depth of the adjacent characters.

Returning to FIG. 1, at step 110, the system detects a noise or an obstruction in a character. Detecting the noise or the obstruction in the character is done by finding areas in which a stroke feature does not conform to the measured stroke feature of the character and/or the measured stroke feature of the adjacent characters. The system may further detect areas in which statistics do not conform to measured statistics of the adjacent characters. The areas, in which a stroke feature does not conform to the measured stroke features and/or in which statistics do not conform to the measured statistics, are called noisy or obstructed areas. Areas having stroke features that conform to the measured stroke features and/or having statistics that conforms to the measured statistics are called unobstructed areas. The unobstructed areas are parts of the character that are not affected by a noise or an obstruction. In one embodiment, after determining unobstructed areas, the system measure stroke feature(s) of the unobstructed areas of the character. The system may additionally search areas in which a stroke feature does not conform to the measured stroke feature(s) of the unobstructed areas.

In one embodiment, at step 120, the system may additionally perform dividing the character to precisely detect a noise or an obstruction. The system divides the character into parts, e.g., 4 parts. Then, the system analyzes each part to determine whether the part is affected by a noise or an obstruction, e.g., by comparing a stroke feature of the part to the measured stroke feature of unobstructed areas or the adjacent character. Upon finding a part that is affected by a noise or an obstruction, the system further divides the part into a number of subparts, e.g., 4 subparts. Then, the system analyzes each subpart to determine whether each subpart is affected by a noise or an obstruction, by comparing a stroke feature of the subpart to the measured stroke feature of unobstructed areas or the adjacent character. This dividing process is repeated until the system locates at least one area in a subpart in which a stroke feature does not conform to the measured stroke feature of the unobstructed areas or the adjacent character or in which a stroke feature has a wide variation with the measured stroke feature of the unobstructed areas or the adjacent character. This repeatedly dividing character to precisely locate an area where a noise or an obstruction affects is called a hierarchical grid structure.

At step 130, templates are updated based on the detected noise or obstruction. After finding noisy areas or obstructed areas in the character, same areas are removed from templates. For example, in FIG. 3 (*a*)-(*b*), the system receives a character such as FIG. 3 (*a*) as an input. Then, the system determines a noisy area or obstructed area through steps 110-120. At steps 110-120, an area 300 may be determined as a noisy area or an obstructed area. Areas 310-320 may be determined as an unobstructed area. Then, at step 130, the system removes areas, which are equivalent to the noisy area or obstructed area in the character, in the templates. After removing the equivalent areas in a template, the template may look like FIG. 3 (*b*). The system may also remove the noisy or obstructed areas in the character.

At step 140, the system classifies the character in one of the updated templates. Then, the character may be identified as a letter, a number or a symbol that the template, which the character is classified in, represents. One way to perform a classification is matching each template to the character. The system counts the number of matching first-type pixels (e.g., black pixels) in a template and the character to be recognized. The system also counts the number of matching a second-type pixels (e.g., white pixels) in the template and the character. The system sets pixels in the noisy or obstructed areas in the character as don't care pixels. A don't care pixel refers to a pixel that can be either the first-type or second-type. Thus, one embodiment of the present invention have don't care pixels near edges and/or the noisy or obstructed areas. The system counts don't care pixels in the character. Then, for each template and the character pair, the system calculates a value of (the number of matching first-type pixels+the number of matching second-type pixels−the number of don't care pixels). The system selects a pair of a template and the character that has a highest value of (the number of matching first-type pixels+the number of matching second-type pixels−the number of don't care pixels). The selected pair has the highest value among the calculated values of all pairs of each template and the character. Then, the system identifies the character as a letter, a number or a symbol that the template in the selected pair represents.

In one embodiment, the system performs a classification of a character by comparing the updated templates and the character. The system performs the comparison between the updated templates and the character by one or more of: correlating each of the updated templates with the character, finding difference between each of the updated templates and the character and utilizing a trained neural network to identify the character. In one embodiment, a correlation value between each of updated templates and the character is calculated. A template that generated a highest correlation value is selected as a template to represent the character. Tong Qu et al, "A stroke based algorithm for dynamic signature verification" (hereinafter "Tong"), CCECE 2004, incorporated by reference herewith, describes calculating a correlation value between a template (reference) and a character (signature). In another embodiment, the difference between each of the updated templates and the character is calculated, e.g., by executing (the number of matching pixels−number of don't care pixels) between each updated template and the character. In this embodiment, a template that has a least difference or a highest similarity is selected to represent the character. In an alternative embodiment, the system utilizes a trained neural network to classify or identify the character. The trained neural network refers to an interconnected network of artificial neurons that uses a mathematical or computational model for information processing. The trained neural network is trained by receiving data samples accompanied with known responses, e.g., an image including a character "b" followed by an ASCII representation for "b". Then, the trained neural network classifies unseen characters based on the training. In a further embodiment, a supervised learning, unsupervised learning or reinforcement learning may be utilized to implement or improve the classification. The supervised learning refers to an environment where all available input and output pairs are known. Thus, when a system receives an input in the supervised learning environment, the system can know its corresponding output. The unsupervised learning refers to an environment where all available input and output pairs are unknown. While operating a system in the unsupervised learning environment, the system predicts its output based on its currently available input and output pairs. In the unsupervised learning environment, the predicted output may be correct or wrong. The reinforcement learning refers to an environment where a reward is assigned when a system correctly predicts an output. When the system mispredicts an output, a penalty is assigned to the system.

Figure 5:
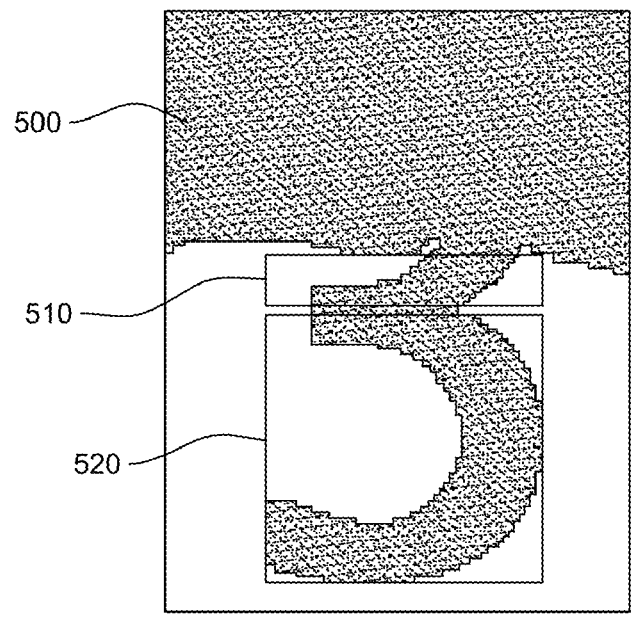
FIG. 5(a) illustrates an example of a traditional sub-division method.
FIG. 5(b) illustrates an example of a sub-division method in one embodiment of the present invention.
Figure 5:
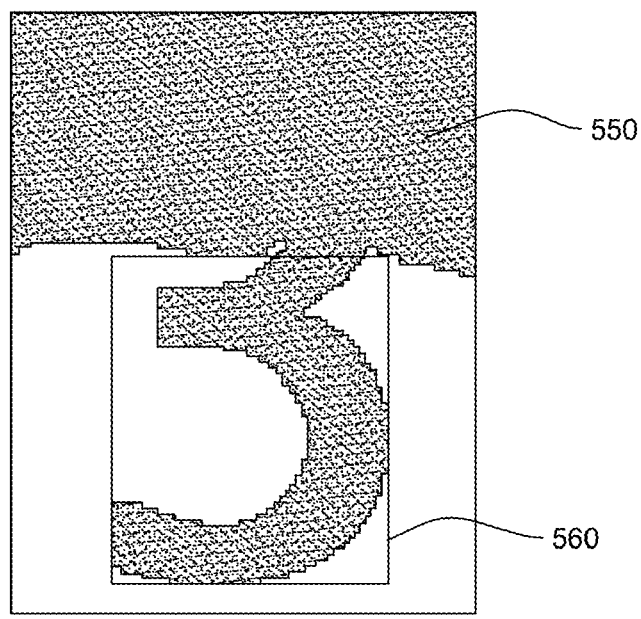

FIG. 5 illustrates a difference between a traditional dividing method and a dividing method of one embodiment of the present invention. FIG. 5(*a*) illustrates a result of the traditional dividing method. FIG. 5(*b*) illustrates a result of dividing method in one embodiment of the present invention. The traditional dividing method divides a character into half and then removes upper or lower part that affected by a noise or obstruction. In this example (FIG. 5(*a*)), the traditional method removes the upper half part, a noise area 500 and an unobstructed area 510. Then, the traditional method tries to identify the character only with lower half part of the character 520. In other words, the traditional method does not utilize an unobstructed area 510 to identify the character, because the traditional method disregards the upper half part of the character. Thus, the traditional method cannot identify whether the character is a number 3 or a number 5. However, one embodiment of the present invention utilizes all unobstructed areas to identify a character. For example, the system (e.g., the system 10 in FIG. 2) detects noisy or obstructed areas by performing method steps 100-120. Then, the system removes corresponding noisy or obstructed areas in the character and every template by performing step 130. Then, the system tries to identify the character by performing method step 140. Because the system utilizes all the unobstructed area 560, the system identifies that the character is 3,e.g., by matching the character to every template after removing the noisy or obstructed areas.

Figure 2:
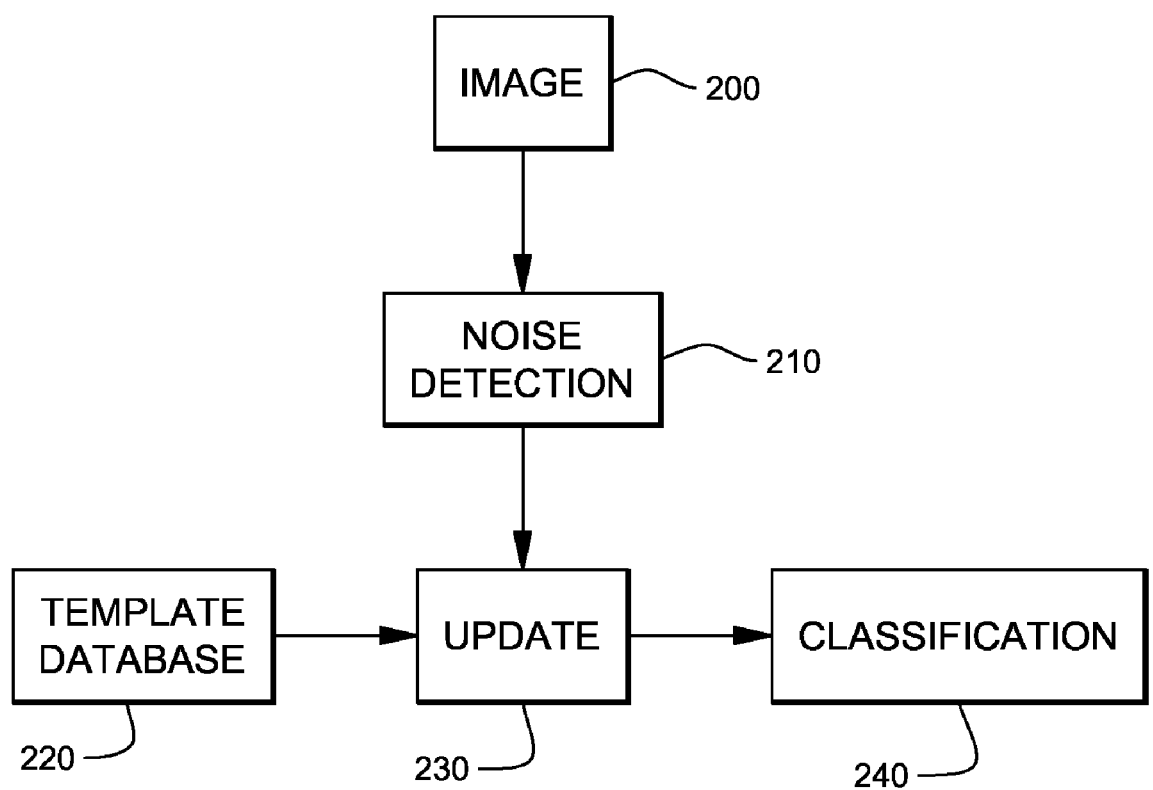
FIG. 2 illustrates a system diagram of one embodiment of the present invention employs.

FIG. 2 illustrates a system diagram in one embodiment of the present invention, in which the method steps of FIG. 1 are employed. The system 10 performing an OCR includes, but is not limited to, an image processing device 200, a noise detector 210, a template storage device 220, a template update module 230 and a classification module 240. The image processing device 200 receives an image with a plurality of characters or an image with a character from an image capturing device (not shown) (e.g., a camera, scanner, etc.). After receiving the image, the image processing device 200 performs an image enhancement, e.g., by applying low-pass filtering or edge detection techniques. The image processing device 200 also extracts stroke features of characters in the image. FIG. 4 illustrates an example of extracting a stroke width, which is a stroke feature. The image processing device 200 obtains the stroke width by measuring the number pixels in a width of a stroke. In this example (FIG. 4), the stroke width is 4 pixels. In one embodiment, the image processing device obtains stroke features in areas of a character, e.g., by diving a character into parts and measuring stroke features of the parts. A part may be an area or may comprise a plurality of areas. The image processing device 200 may calculate average stroke features of the characters in the mage. For example, an average stroke width of characters can be obtained by obtaining a stroke width of each character, summing each obtained stroke width and dividing the summation by the number of characters. The image processing device 200 may calculate average stroke features of the character. For example, an average stroke width of areas of the character can be obtained by obtaining a stroke width of each area, summing each obtained stroke width and dividing the summation by the number of areas.

Upon receiving the image from the image processing device 200, the noise detector 210 detects a noise or an obstruction in a character in the image. The noise detector 210 finds a character whose stroke features do not conform to the calculated average stroke feature of the characters. Then, the noise detector 210 determines that the character has a noise or an obstruction, because its stroke features do not conform to calculated average stroke features. Then, the noise detector 210 may divide the character into parts to precisely locate part(s) affected by a noise or an obstruction. For example, the noise detector 210 may divide the character into 4 parts. Then, the noise detector 210 determines whether a part conforms to the calculated average stroke feature of the character. For example, if, in a part of the character, it is determined that a character width stops conforming to the calculated stroke width, the noise detector 210 determines that the part is affected by a noise or an obstruction. The noise detector may further divide a part to areas to more precisely locate areas affected by a noise or an obstruction. For example, the noise detector 210 may divide a part into 4 areas. Then, the noise detector 210 determines whether an area conforms to the calculated average stroke feature of the character. For example, if in an area of the character a character width stops conforming to the calculated stroke width, the noise detector 210 determines that the area is affected by a noise or an obstruction.

The template storage device 220 stores templates for the characters in the image. Templates represent all possible characters in the image. A template is stored in the template storage device 220 as an image such as JPEG image, GIF image, Bitmap image, PNG image, TIFF image, etc. A template may represent a character. The template storage device is one or more of: a magnetic disk, an optical disk, a compact disc, a digital versatile disc, a direct access storage device, a solid state drive, a hard disk, a memory, etc.

Figure 3:
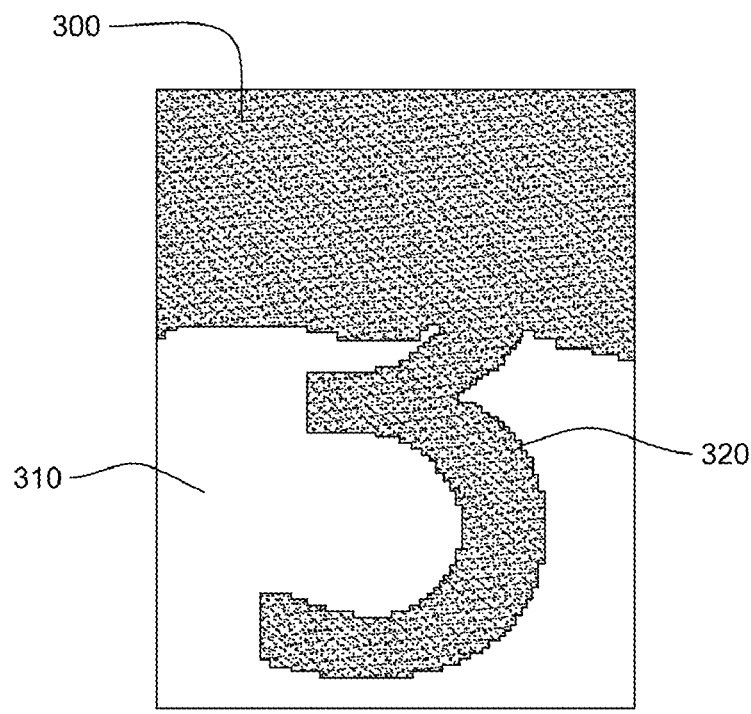
FIG. 3(a) illustrates an example of a distorted character.
FIG. 3(b) illustrates an example of a template or a character after removing areas that are affected by a noise or an obstruction.
Figure 3:
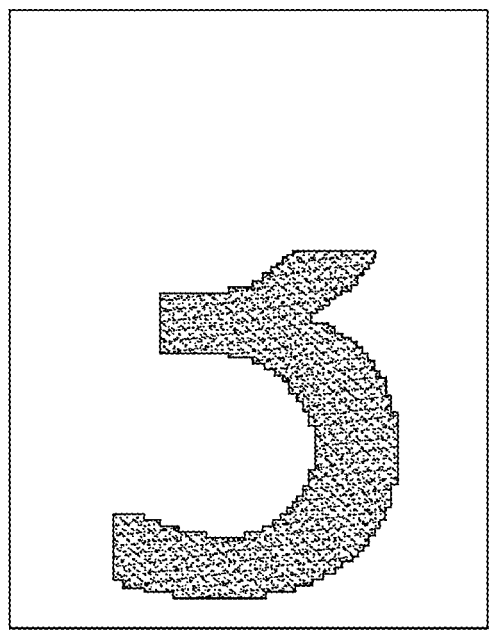

The template storage device 220 provides the templates to the template update module 230. The noise detector 210 provides a character that is affected by a noise or an obstruction. The noise detector 210 further provides areas in the character that is affected by the noise or obstruction to the template update module 230. Then, the template update module 230 updates the templates provided from the template storage device 220 based on the area(s) affected by the noise or the obstruction. In one embodiment, after receiving the areas being affected by the noise or obstruction, the template update module 230 updates the templates by removing equivalent areas in the templates. If the areas in the character being affected by the noise or obstruction are an upper ⅓ part of the character, e.g., FIG. 3 (a) 300, the template update module 230 removes an upper ⅓ part in every template. FIG. 3 (b) illustrates a template after removing the upper ⅓ part of it.

The classification module 240 classifies the character being affected by the noise or obstruction into a template among the updated templates. In one embodiment, the classification module 240 counts the number of matching pixels between a template and the character. The classification module 240 sets pixels in the area(s) being affected by the noise or obstruction as don't care pixels. The classification module 240 may also set pixels near edges as don't care pixels. Then, the classification module 240 finds a template which generates the highest number of matching pixels. The classification module 240 selects the template generating the highest number of matching pixels as a template to represent the character being affected by the noise or obstruction. Then, the system 10 identifies the character as a letter, a number or a symbol that the selected template represents. In one embodiment, the classification module 240 looks for a template which generates a highest value of (the number of matching pixels–the number of don't care pixels in the character). Then, the classification module 240 selects the template generating the highest value as a template to represent the character.

In one embodiment, the image processing device 200, the noise detector 210, the template update module 230 and the classification module 240 in the system 10 are implemented as software using a programming language (e.g., C, C++, Java, .NET, etc.). In one embodiment, the image processing device 200, the noise detector 210, the template update module 230 and the classification module 240 in the system 10 are recorded in a computer readable medium (e.g., CD (Compact Disc), DVD (Digital Versatile Disc), HDD (Hard Disk Drive), a memory) as an instruction (e.g., a machine language or assembly language) that is executed by a processor (e.g., Intel® Pentium®, IBM® Power PC®, AMD® Opteron®).

In another embodiment, the image processing device 200, the noise detector 210, the template update module 230 and the classification module 240 in the system 10 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In a further embodiment, the image processing device 200, the noise detector 210, the template update module 230 and the classification module 240 in the system 10 are implemented on a semiconductor chip (e.g., ASIC (Application-Specific Integrated Circuit)) using a semi custom design methodology (i.e., designing a chip using standard cells and a hardware description language).

In a further embodiment, FIG. 6 illustrates a hardware configuration of the system 10 executing the method steps in FIG. 1. The hardware configuration preferably has at least one processor or central processing unit (CPU) 1611. The CPUs 1611 are interconnected via a system bus 1612 to a random access memory (RAM) 1614, read-only memory (ROM) 1616, input/output (I/O) adapter 1618 (for connecting peripheral devices such as disk units 1621 and tape drives 1640 to the bus 1612), user interface adapter 1622 (for connecting a keyboard 1624, mouse 1626, speaker 1628, microphone 1632, and/or other user interface device to the bus 1612), a communication adapter 1634 for connecting the system 1600 to a data processing network, the Internet, an Intranet, a personal area network (PAN), etc., and a display adapter 1636 for connecting the bus 1612 to a display device 1638 and/or printer 1639 (e.g., a digital printer of the like).

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention.

The present invention further includes a method of deploying a computer program product including a program of instructions in a computer readable medium for one or more function of this invention, wherein, when the program of instructions is executed by a processor, the computer program product performs the one or more functions of this invention.

Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art

What is claimed is:

1. A system for recognizing a character with a noise or an obstruction in an image, the image including a plurality of characters, comprising:
   at least one memory storage device and at least one processor unit coupled to the at least one memory storage device, wherein the at least one processor unit is configured to perform:
   calculating a stroke feature of unobstructed areas of the character, the unobstructed areas of the character not having any effect from the noise or the obstruction;
   calculating statistics of adjacent characters of the character, the adjacent characters not having any effect from the noise or the obstruction;
   detecting the noise or the obstruction in the character by finding at least one area of the character in which a stroke feature does not conform to the calculated stroke feature of the unobstructed areas or in which statistics do not conform to the calculated statistics of the adjacent characters;
   providing one or more templates of the plurality of characters;
   updating the one or more templates of the plurality of characters based on the detected noise or the detected obstruction; and
   classifying the character in one of the updated templates of the plurality of characters, the character being recognized as a letter, number or symbol that a template, which the character is classified in, represents, wherein the classifying further includes:
   counting a number of matching first-type pixels in a first template and the character;
   counting a number of matching second-type pixels in the first template and the character;
   setting pixels in the at least one area in the character as don't care pixels;
   counting a number of the don't care pixels in the character;
   calculating a value of (the number of the matching first-type pixels+the number of the matching second-type pixels−the number of the don't care pixels) for each pair of each template and the character;
   selecting a pair of a template and the character that has a highest calculated value among the calculated values of pairs of each template and the character; and
   identifying the character as the letter, the number or the symbol that the template in the selected pair represents.

2. The system according to claim 1, wherein in order to perform the updating, the at least one processor unit is further configured to perform:
   removing the at least one area in the one or more templates; and
   removing the at least one area in the character.

3. The system according to claim 1, wherein the stroke feature is one or more of:
   a stroke width, a stroke length, a stroke size, a stroke duration, a stroke orientation, a stroke shape and a stroke pattern.

4. The system according to claim 1, wherein the statistics is one or more of:
   a font height, an ascent value and a descent value.

5. The system according to claim 1, wherein the at least one processor unit is further configured to perform:
   dividing the character into parts; and
   analyzing each part to determine whether the part is affected by the noise or the obstruction.

6. The system according to claim 5, wherein the at least one processor unit is further configured to perform:
- further dividing a part into subparts, if the part is affected by the noise or the obstruction;
- finding at least one area in a subpart, wherein the at least one area in the subpart does not conform to the calculated stroke feature.

7. The system according to claim 1, wherein in order to perform the classifying, the at least one processor unit is further configured to perform a comparison between the updated templates and the character in order to recognize the character.

8. The system according to claim 7, wherein the the at least one processor unit is further configured to perform the comparison based on one or more of: correlating each of the updated templates with the character, finding difference between each of the updated templates and the character, and utilizing a trained neural network to identify the character.

9. A method for recognizing a character with a noise or an obstruction in an image, the image including a plurality of characters, comprising:
- calculating a stroke feature of unobstructed areas of the character, the unobstructed areas of the character not having any effect from the noise or the obstruction;
- calculating statistics of adjacent characters of the character, the adjacent characters not having any effect from the noise or the obstruction;
- detecting the noise or the obstruction in the character by finding at least one area of the character in which a stroke feature does not conform to the calculated stroke feature of the unobstructed areas or in which statistics do not conform to the calculated statistics of the adjacent characters;
- providing one or more templates of the plurality of characters;
- updating the one or more templates of the plurality of characters based on the detected noise or the detected obstruction; and
- classifying the character in one of the updated templates of the plurality of characters, the character being recognized as a letter, number or symbol that a template, which the character is classified in, represents, wherein the classifying further includes:
  - counting a number of matching first-type pixels in a first template and the character;
  - counting a number of matching second-type pixels in the first template and the character;
  - setting pixels in the at least one area in the character as don't care pixels;
  - counting a number of the don't care pixels in the character;
  - calculating a value of (the number of the matching first-type pixels+the number of the matching second-type pixels−the number of the don't care pixels) for each pair of each template and the character;
  - selecting a pair of a template and the character that has a highest calculated value among the calculated values of pairs of each template and the character; and
  - identifying the character as the letter, the number or the symbol that the template in the selected pair represents,
- wherein at least one processor unit, coupled to at least one memory storage device, is configured to perform the calculating the stroke feature, the calculating the statistics, the providing, the updating, and the classifying.

10. The method according to claim 9, wherein the updating comprises:
- removing the at least one area in the one or more templates; and
- removing the at least one area in the character.

11. The method according to claim 9, wherein the stroke feature is one or more of:
- a stroke width, a stroke length, a stroke size, a stroke duration, a stroke orientation, a stroke shape and a stroke pattern.

12. The system according to claim 9, wherein the statistics is one or more of:
- a font height, an ascent value and a descent value.

13. The method according to claim 9, further comprising:
- dividing the character into parts; and
- analyzing each part to determine whether the part is affected by the noise or the obstruction.

14. The method according to claim 13, further comprising:
- further dividing a part into subparts, if the part is affected by the noise or the obstruction;
- finding at least one area in a subpart, wherein the at least one area in the subpart does not conform to the calculated stroke feature.

15. The method according to claim 9, wherein the classifying performs a comparison between the updated templates and the character to recognize the character.

16. The method according to claim 15, wherein the classifying performs the comparison based on one or more of: correlating each of the updated templates with the character, finding difference between each of the updated templates and the character, and utilizing a trained neural network to identify the character.

17. A non-transitory computer readable medium embodying computer program instructions being executed by a processor for causing a computer to perform method steps for recognizing a character with a noise or an obstruction in an image, the image including a plurality of characters, said method steps comprising the steps of claim 9.

18. A method of deploying a computer program product including a program of instructions in a non-transitory computer readable medium for recognizing a character with a noise or an obstruction in an image, the image including a plurality of characters, wherein, when the program of instructions is executed by a processor, the computer program product performs the steps of claim 9.

* * * * *